A. BENSON.
PROCESS OF CUTTING WORM GEARS.
APPLICATION FILED FEB. 3, 1913.
1,131,198.
Patented Mar. 9, 1915.
Fig. 1
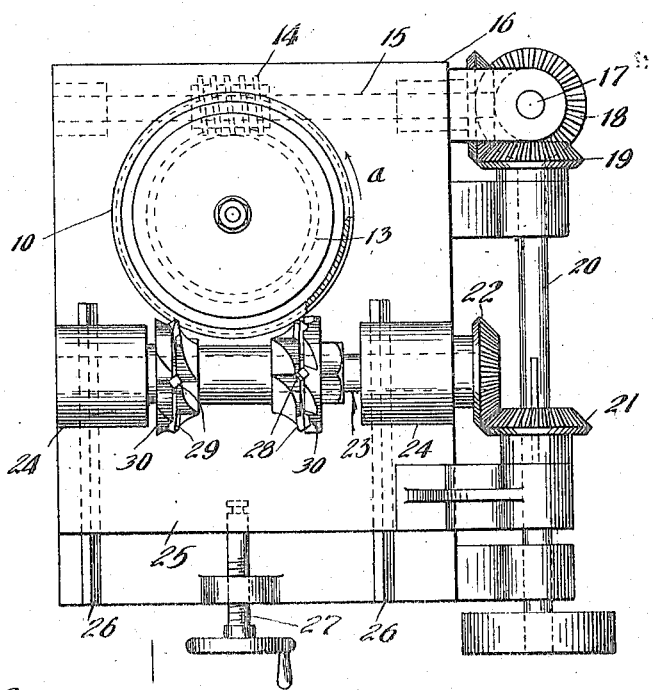
Fig. 2
Fig. 3
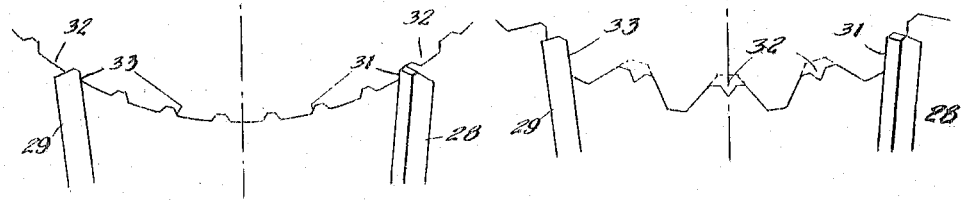
Fig. 4
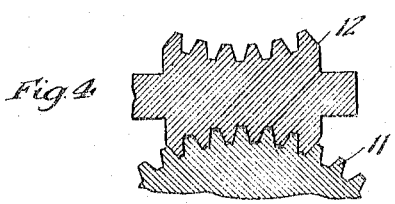
Witnesses:
Wm. Geiger
Pearl Abrams
Inventor:
Andrew Benson
By Munday, Evarts, Adcock & Clarke,
his Attys

UNITED STATES PATENT OFFICE.

ANDREW BENSON, OF CHICAGO, ILLINOIS, ASSIGNOR TO BENSON GEAR COMPANY, OF CHICAGO, ILLINOIS, A CORPORATION OF ILLINOIS.

PROCESS OF CUTTING WORM-GEARS.

1,131,198.  Specification of Letters Patent.  Patented Mar. 9, 1915.

Application filed February 3, 1913. Serial No. 745,891.

*To all whom it may concern:*

Be it known that I, ANDREW BENSON, a citizen of the United States, residing in Chicago, in the county of Cook and State of Illinois, have invented a new and useful Improvement in Processes of Cutting Worm-Gears, of which the following is a specification.

This invention relates to improvements in the process of cutting worm-gears, and more particularly to the process of cutting teeth of worm-gears such as are used with worms of the type commonly known as the "Hindley" screw; that is, a worm of such form that if any plane be taken through its longitudinal axis, the intersections of the plane by the perimeter are arcs of the pitch-circle of the worm-gear with which the screw is intended to work.

Objects of the invention are to devise a process of cutting the teeth of worm-gears of the type above indicated, which is much simpler and quicker than any now used; that insures the cutting of perfectly formed teeth; and that is applicable to the cutting of worm-gears of any size, having any number of teeth and of any desired pitch.

The invention furthermore consists in the improvements in the steps and novel combinations of the steps of the process, as herein shown, described or claimed.

Heretofore, so far as I am aware, it has been the usual practice to cut worm-gears by means of a hob of the same form as the worm to be used with the worm-gear, said hob being provided with cutting edges or faces throughout the entire length of the thread of the hob. In the case of the ordinary worm and worm-gear, that is, a worm having a constant diameter throughout its length, the formation of a hob suitable for generating or cutting the worm-gear is a relatively simple matter, since the cutting edges may be made by cutting a plurality of straight slots through the threads of the hob at right angles to the slope of the thread, which is, of course, constant. When, however, a hob is to be formed suitable for cutting a worm-gear to be used with a worm of the Hindley screw type, each cutting edge or point on the thread of the hob must be formed independently, since the diameter of the thread of the hob is a constantly changing one, and the angle of the faces of the thread is likewise a constantly changing one, and in order to take into account both of the above named variable elements and keep the cutting edges always at right angles to the slope of the thread, it is necessary to form the cutting edges individually, as above indicated. Such a hob is not only expensive to manufacture, since the cutting edges must all be formed by hand, but on account of the cutting edges being necessarily separated, the teeth cut on the worm-gear will be more or less imperfect, with the result that the transmission of power from the worm to the worm-gear will be inefficient. Another undesirable feature of the use of a hob of the type above indicated for generating or cutting the worm-gear teeth resides in the fact that as soon as the cutting edges become worn to any extent, a new hob has to be made, thus adding again to the cost of manufacture of worm-gears.

In cutting the teeth of worm-gears by hobs under the old method, the faces of adjacent teeth are cut simultaneously and the same tooth is cut from both sides at the same time, the cuts of course being made deeper and deeper as the cutting operation proceeds. With my process, however, I propose to cut the worm-gear teeth on one side only at a time, and to cut the same or corresponding sides or faces of all the teeth successively. With my process, also, I propose to cut oppositely disposed sides or faces of two non-consecutive teeth simultaneously and continue the cutting operation progressively until all the teeth are made of the desired form.

In the drawing forming a part of this specification, Figure 1 shows a mechanism suitable for carrying out my improved process. Figs. 2 and 3 are diagrammatic views illustrating two stages of the process of cutting the worm-gear teeth, and Fig. 4 is a detail view illustrating a Hindley screw worm and a worm-gear adapted to be cut by my process.

In said drawing, 10 denotes the blank or casting which is adapted to be cut to form a worm-gear, such as shown at 11 in Fig. 4, and driven as by means of a worm 12 of the Hindley screw type.

In practice, the blank 10 will first be concaved on its periphery so that the finished worm-gear will properly fit the worm, and the blank is then placed on a vertical arbor and clamped thereon and rotated thereby in the direction indicated by the arrow *a* in Fig. 1, said arbor on which the blank is mounted being driven by means of a worm-gear 13 and worm 14 on a shaft 15, suitably mounted in a frame 16. The shaft 15 is driven by means of a bevel gear (not shown) on the lower end of a vertical shaft 17, the latter being in turn driven by means of a bevel gear 18, and bevel gear 19, on horizontal shaft 20, the latter being driven from any suitable source of power, not shown. Keyed to shaft 20 and slidable thereon is a bevel gear 21, meshing with a bevel gear 22 adapted to drive a horizontal shaft 23 mounted in suitable bearings 24 on a slide 25, mounted on guide-ways 26 on the top of the frame 16, said slide 25 being moved backward and forward by means of a hand-operated swiveled adjusting screw 27. Mounted on the shaft or arbor 23 are two sets of cutting tools 28 and 29, said tools being held in place between two clamp plates 30, 30. The cutting tools 28 and 29, which may be formed of any high grade cutting steel, are arranged radially of the arbor 23 and adjusted at an angle thereto corresponding to the face of that portion of the thread of the worm with which the worm-gear to be cut is to be used, and which would be intersected by said cutting tools. The number of the cutting tools will depend upon the number of threads on the worm and the amounts the tools 28 and 29 are angularly offset from each other will determine the thickness of the finished teeth in the worm-gear.

The operation is as follows: As will be understood, the blank from which the worm-gear is formed and the cutting tools will be continuously rotated in proper synchronism, and the cutting tools will be gradually and progressively fed toward the blank by means of the hand operated adjusting screw 27. When the blank is rotating in the direction indicated by the arrow *a*, the cutting tools 28 will cut the forward or advancing sides or faces 31 of each successive tooth, and at the same time will begin to cut away some of the waste material 32 between the tooth being cut and the tooth in advance thereof. Simultaneously with the above described operation, the cutting tools 29 will begin to cut the rear or receding faces 33 of each successive tooth and will also begin to cut away, from the opposite side, some of the waste material 32 between the tooth being operated upon and the next adjacent tooth. This operation is continued until all of the waste material between each pair of teeth is cut away. As will be understood, each tool of each of the sets 28 and 29 will engage one tooth only on the worm-gear during a complete rotation of the arbor supporting the tools.

From the foregoing description, it will be seen that the teeth on the worm-gear will be accurately and uniformly cut, due to the fact that each cutting tool will move in a path corresponding to the portion of the thread on the worm with which the worm-gear being cut is to be used, and which would be intersected by the cutting tool, it being obvious that the worm-gear blank and the cutting tools are rotated at the same ratio of speeds as will be maintained between the worm and worm-gear in use.

I claim:—

1. The process of cutting worm-gears for use with worms of the Hindley screw type having a plurality of threads, which consists in rotating the worm-gear blank about its axis, simultaneously and synchronously cutting successive advancing faces only of the worm-gear teeth at one point of its circumference and simultaneously and synchronously cutting successive receding faces only of other teeth of the worm-gear at another point of its circumference, the cutters being rotated about an axis parallel to that of the worm with which the worm-gear is to coöperate, substantially as specified.

2. The process of cutting worm-gears for use with worms of the Hindley screw type, which consists in rotating the blank in which the worm-gear is to be cut, and simultaneously progressively cutting the forward or advancing faces only of the teeth at one point, and cutting the rear or receding faces only of the teeth at another point, substantially as specified.

3. The process of cutting worm-gears, which consists in rotating the blank in which the worm-gear is to be cut, and at the same time cutting only all the sides of the teeth facing in one direction at one point, and cutting only all the sides of the teeth facing in the opposite direction at another point, substantially as specified.

4. The process of cutting worm-gears, which consists in rotating the blank from which the worm-gear is to be formed and simultaneously cutting oppositely facing sides only of non-consecutive teeth, successively, substantially as specified.

5. The process of cutting worm-gears of the class described, which consists in rotating the blank from which the worm-gear is to be formed, and successively cutting only oppositely facing sides of non-consecutive teeth at two separated points by cutters rotating in synchronism with the rotating blank, and about an axis perpendicular to the axis of rotation of the blank, substantially as specified.

6. The process of cutting worm-gears suitable for use with worms of the Hindley screw type, which consists in first forming the blank from which the worm-gear is to be formed, with a concaved periphery, rotating said blank, and simultaneously cutting only oppositely facing sides of non-consecutive teeth by means of cutters rotatable about an axis perpendicular to the axis of rotation of said blank, substantially as specified.

ANDREW BENSON.

Witnesses:
 JOSEPH HARRIS,
 WILLIAM A. GEIGER